US012461470B2

(12) United States Patent
Saito et al.

(10) Patent No.: US 12,461,470 B2
(45) Date of Patent: Nov. 4, 2025

(54) DEVELOPING DEVICE, PROCESS CARTRIDGE, AND IMAGE FORMING APPARATUS INCLUDING A HOLDER WHICH HAS PROJECTIONS WITHIN A HOLE ACCOMODATING A DEVELOPER REGULATOR OR A DEVELOPING ROLLER

(71) Applicants: Osamu Saito, Kanagawa (JP); Yuuji Ishikura, Kanagawa (JP); Yumi Inoue, Kanagawa (JP); Tatsuya Ohhira, Kanagawa (JP); Toshiki Hayashi, Kanagawa (JP)

(72) Inventors: Osamu Saito, Kanagawa (JP); Yuuji Ishikura, Kanagawa (JP); Yumi Inoue, Kanagawa (JP); Tatsuya Ohhira, Kanagawa (JP); Toshiki Hayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/669,582

(22) Filed: May 21, 2024

(65) Prior Publication Data

US 2024/0393714 A1 Nov. 28, 2024

(30) Foreign Application Priority Data

May 23, 2023 (JP) ................................ 2023-084377

(51) Int. Cl.
*G03G 15/08* (2006.01)
*G03G 15/09* (2006.01)

(52) U.S. Cl.
CPC ....... *G03G 15/087* (2013.01); *G03G 15/0812* (2013.01); *G03G 15/0891* (2013.01);
(Continued)

(58) Field of Classification Search
CPC ............ G03G 15/087; G03G 15/0891; G03G 2215/025; G03G 15/0893; G03G 15/09;
(Continued)

(56) References Cited

U.S. PATENT DOCUMENTS 4,721,982 A * 1/1988 Ueda ................. G03G 15/0822 430/122.1
9,625,851 B2 4/2017 Oshikawa et al.
(Continued)

FOREIGN PATENT DOCUMENTS

JP H09-281796 A 10/1997
JP 2010-243633 A 10/2010
(Continued)

OTHER PUBLICATIONS

European Search Report issued Oct. 28, 2024 in European Patent Application No. 24176606.2, 8 pages.

*Primary Examiner* — Stephanie E Bloss
*Assistant Examiner* — Laura Roth
(74) *Attorney, Agent, or Firm* — XSENSUS LLP

(57) ABSTRACT

A developing device of developing a latent image formed on an image bearer includes a developing roller, a developer regulator of a round-bar shape, and a holder. The developing roller carries developer. The developer regulator faces the developing roller to regulate an amount of the developer carried on a surface of the developing roller. The holder has a first hole, a second hole, and a projection. An end of the developer regulator is inserted in the first hole. A shaft at an end of the developing roller is inserted in the second hole. The projection protrudes toward an inside of the at least one of the first hole or the second hole and holds the end of the developer regulator and the shaft.

14 Claims, 6 Drawing Sheets

(52) U.S. Cl.
CPC ......... *G03G 15/09* (2013.01); *G03G 15/0935* (2013.01); *G03G 15/0813* (2013.01); *G03G 2215/025* (2013.01); *G03G 2215/0609* (2013.01); *G03G 2215/0866* (2013.01)

(58) Field of Classification Search
CPC ........... G03G 15/0812; G03G 15/0813; G03G 15/0806; G03G 15/0935; G03G 15/081; G03G 2215/0609; G03G 2215/0866
See application file for complete search history.

(56) References Cited

U.S. PATENT DOCUMENTS

| | | | | |
|---|---|---|---|---|
| 2009/0169246 | A1 | 7/2009 | Ooyoshi et al. | |
| 2010/0202796 | A1 | 8/2010 | Ooyoshi et al. | |
| 2012/0099906 | A1 * | 4/2012 | Nishizawa ......... | G03G 15/0812 399/284 |
| 2013/0064570 | A1 | 3/2013 | Yamane et al. | |
| 2013/0216250 | A1 | 8/2013 | Seki et al. | |
| 2013/0315636 | A1 * | 11/2013 | Takayama .......... | G03G 15/0812 399/272 |
| 2014/0140722 | A1 | 5/2014 | Ohkubo et al. | |
| 2015/0063865 | A1 | 3/2015 | Furuichi et al. | |
| 2016/0238966 | A1 * | 8/2016 | Oshikawa .............. | G03G 15/09 |
| 2017/0090342 | A1 | 3/2017 | Ohhira et al. | |
| 2017/0108795 | A1 | 4/2017 | Oshikawa et al. | |
| 2018/0136586 | A1 | 5/2018 | Tsuchiya et al. | |
| 2020/0166886 | A1 | 5/2020 | Saito et al. | |
| 2020/0172359 | A1 | 6/2020 | Nanno et al. | |
| 2023/0367256 | A1 | 11/2023 | Saito et al. | |

FOREIGN PATENT DOCUMENTS

| | | | |
|---|---|---|---|
| JP | 2012-093420 | A | 5/2012 |
| JP | 2017-219773 | A | 12/2017 |
| JP | 2018-028585 | A | 2/2018 |
| JP | 2018-036352 | A | 3/2018 |
| JP | 2018-055050 | A | 4/2018 |
| JP | 2018-146759 | A | 9/2018 |

* cited by examiner

DEVELOPING DEVICE, PROCESS CARTRIDGE, AND IMAGE FORMING APPARATUS INCLUDING A HOLDER WHICH HAS PROJECTIONS WITHIN A HOLE ACCOMODATING A DEVELOPER REGULATOR OR A DEVELOPING ROLLER

CROSS-REFERENCE TO RELATED APPLICATION

This patent application is based on and claims priority pursuant to 35 U.S.C. § 119 (a) to Japanese Patent Application No. 2023-084377, filed on May 23, 2023, in the Japan Patent Office, the entire disclosure of which is hereby incorporated by reference herein.

BACKGROUND

Technical Field

Embodiments of the present disclosure relate to a developing device to develop a latent image formed on a surface of an image bearer such as a photoconductor drum, a process cartridge including the developing device, and an image forming apparatus including the developing device.

Related Art

A developing device installed in an image forming apparatus such as a copier or a printer is known in which a cylindrical developer regulator (a cylindrical doctor) for regulating the amount of developer carried on a developing roller is installed.

On the other hand, a technology is described in which a supporter (holder) for holding a shaft portion of a developer sleeve and a round-bar-shaped layer-thickness regulator is disposed for the purpose of restricting fluctuations of the amount of developer carried by the developing sleeve (developing roller). In the technology, the supporting member has a push-back member made of an elastic material, which is stuck to an inner circumferential surface of a support hole (hole) for supporting the layer-thickness regulator.

SUMMARY

In an embodiment of the present disclosure, there is provided a developing device of developing a latent image formed on an image bearer that includes a developing roller, a developer regulator of a round-bar shape, and a holder. The developing roller carries developer. The developer regulator faces the developing roller to regulate an amount of the developer carried on a surface of the developing roller. The holder has a first hole, a second hole, and a projection. An end of the developer regulator is inserted in the first hole. A shaft at an end of the developing roller is inserted in the second hole. The projection protrudes toward an inside of the at least one of the first hole or the second hole and holds the end of the developer regulator and the shaft.

In another embodiment of the present disclosure, there is provided a process cartridge attachable to and detachable from a body of an image forming apparatus that includes the developing device and the image bearer united with the developing device.

In still another embodiment of the present disclosure, there is provided an image forming apparatus that includes the developing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
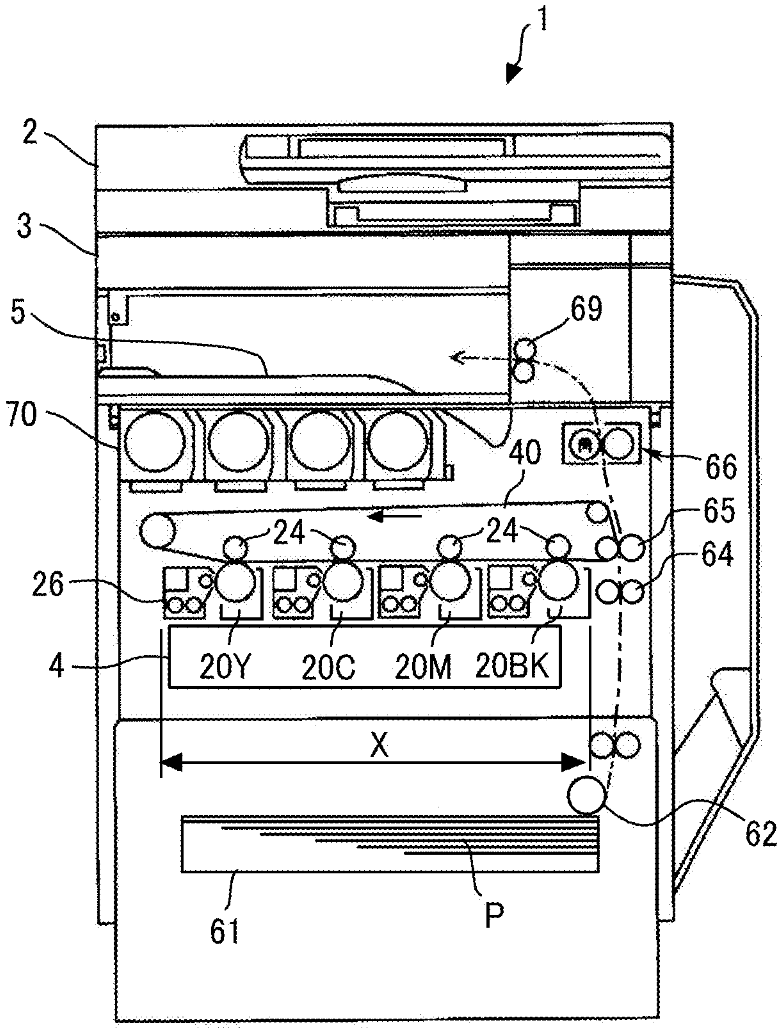
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. Like reference signs are assigned to like elements or components and descriptions of those elements or components may be simplified or omitted. As used herein, the singular forms "a," "an," and "the" are intended to include the plural forms as well, unless the context clearly indicates otherwise.

First, with reference to FIG. 1, a description is given of an overall configuration and operation of an image forming apparatus 1 according to an embodiment of the present disclosure. The image forming apparatus 1 according to the present embodiment is a tandem-type multicolor image forming apparatus in which process cartridges 20Y, 20M, 20C, and 20BK are arranged in parallel to each other, facing an intermediate transfer belt 40. In each of the process cartridges 20Y, 20M, 20C, and 20BK, a developing device 26 (see FIG. 2) is disposed to face a photoconductor drum 21 serving as an image bearer.

In FIG. 1, a body of the image forming apparatus 1, which is illustrated as a color copier in the present embodiment, includes a document conveying device 2, a scanner 3 (document reading device), and a writing device 4 (exposure device). The document conveying device 2 conveys documents to the scanner 3. The scanner 3 scans the documents to read image data. The writing device 4 emits a laser beam based on input image data. Yellow, magenta, cyan, and black toner images are formed on the surfaces of the photoconductor drums 21 of the process cartridges 20Y, 20M, 20C, and 20BK, respectively. The yellow, magenta, cyan, and black toner images on the photoconductor drums 21 are transferred onto the intermediate transfer belt 40 and superimposed. The image forming apparatus 1 further includes a sheet feeder 61, a secondary transfer roller 65, a fixing device 66, and toner containers 70. The sheet feeder 61 stores sheets P such as paper sheets. The secondary transfer roller 65 transfers the toner images formed on the intermediate transfer belt 40 onto a sheet P. The fixing device 66 fixes an unfixed toner image on the sheet P. The toner containers 70 supply toners of respective colors to the developing devices 26 of the corresponding process cartridges 20Y, 20M, 20C, and 20BK.

Figure 2:
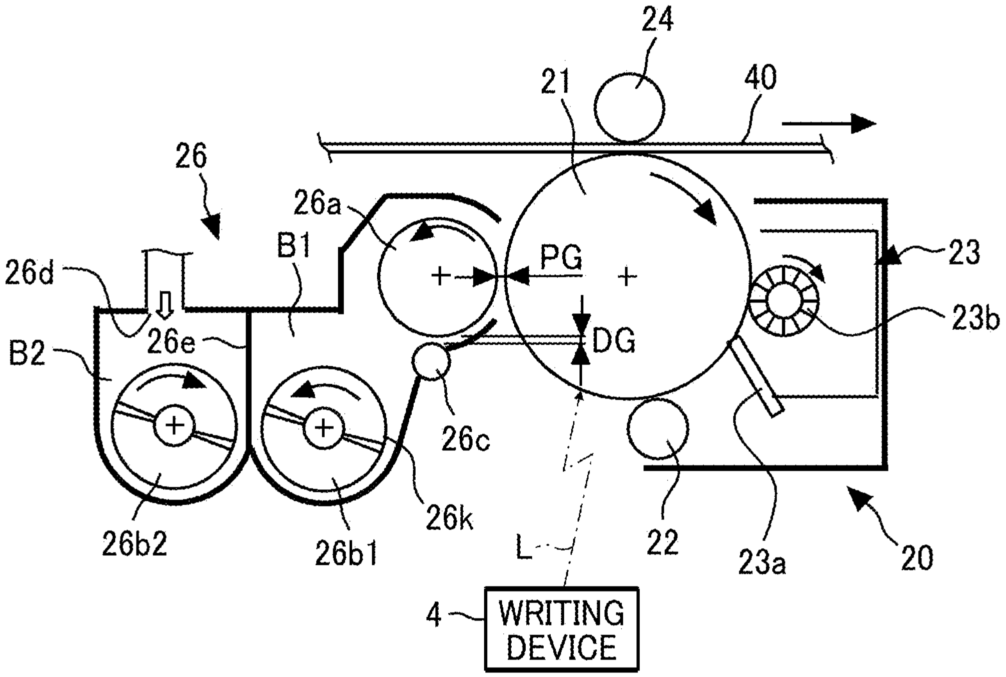
FIG. 2 is a cross-sectional view of an image forming device.

Each of the process cartridges 20Y, 20M, 20C, and 20BK includes the photoconductor drum 21 serving as an image bearer, a charging device 22, and a cleaning device 23, which are united as a single unit as illustrated in FIG. 2. Each of the process cartridges 20Y, 20M, 20C, and 20BK, which is expendable, is replaced with a new one when depleted in a body of the image forming apparatus 1. The developing device 26 is disposed to face the photoconductor drum 21 in each of the process cartridges 20Y, 20M, 20C, and 20BK. Each of the developing devices 26 is replaced with a new one when depleted in the body of the image forming apparatus 1. An operator may independently perform attachment and detachment operations of the developing device 26 with respect to the body of the image forming apparatus 1, and attachment and detachment operations of the process cartridges 20Y, 20M, 20C, and 20BK with respect to the body of the image forming apparatus 1, as different operations. In the process cartridges 20Y, 20M, 20C, and 20BK, the yellow, magenta, cyan, and black toner images are formed on the respective photoconductor drums 21 as the image bearers.

A description is given below of operations of the image forming apparatus 1 to form a normal color toner image. A conveying roller of the document conveying device 2 conveys a document from a document table onto an exposure glass of the document reading device 3. The document reading device 3 optically scans image data for the document on the exposure glass. The yellow, magenta, cyan, and black image data are transmitted to the writing device 4. The writing device 4 irradiates the surface of the photoconductor drums 21 (see FIG. 2) of the process cartridges 20Y, 20M, 20C, and 20BK with laser beams (as exposure light) according to the yellow, magenta, cyan, and black image data, respectively.

Meanwhile, the four photoconductor drums 21 rotate clockwise as illustrated in FIGS. 1 and 2. The surface of the photoconductor drum 21 is uniformly charged at the position opposite the charging device 22 (a charging roller) (in a charging process). Thus, the surface of the photoconductor drum 21 is charged to a charging potential. When the charged surface of the photoconductor drum 21 reaches the position to receive the laser beam L emitted from the writing device 4, an electrostatic latent image is formed on the surface of the photoconductor drum 21 according to the image data (in an exposure process).

The laser beam L corresponding to the yellow image data is emitted to the surface of the photoconductor drum 21 in the process cartridge 20Y, which is the first from the left in FIG. 1 among the four process cartridges 20Y, 20M, 20C, and 20BK. A polygon mirror that rotates at high velocity directs the laser beam L for the yellow image data to the surface of the photoconductor drum 21 along an axial direction of the photoconductor drum 21 (i.e., the main scanning direction). Thus, an electrostatic latent image corresponding to the yellow image data is formed on the photoconductor drum 21 charged by the charging device 22. Similarly, the laser beam L corresponding to the cyan image data is emitted to the surface of the photoconductor drum 21 in the second process cartridge 20C from the left in FIG. 1, thus forming an electrostatic latent image corresponding to the cyan image data on the surface of the photoconductor drum 21. The laser beam L corresponding to the magenta image data is emitted to the surface of the photoconductor drum 21 in the third process cartridge 20M from the left in FIG. 1, thus forming an electrostatic latent image corresponding to the magenta image data on the surface of the photoconductor drum 21. The laser beam L corresponding to the black image data is emitted to the surface of the photoconductor drum 21 in the fourth process cartridge 20BK from the left in FIG. 1, thus forming an electrostatic latent image corresponding to the black image data on the surface of the photoconductor drum 21.

Then, the surface of the photoconductor drum 21 bearing the electrostatic latent image for each color reaches the position opposite the developing device 26. The developing device 26 supplies toner onto the surface of the photoconductor drum 21 and develops the electrostatic latent image on the photoconductor drum 21 into a toner image (in a development process). After the development process, the surface of the photoconductor drum 21 reaches the position opposite the intermediate transfer belt 40. Each of primary transfer rollers 24 is disposed at the position where the surface of the photoconductor drum 21 faces the intermediate transfer belt 40 such that the primary transfer roller 24 contacts an inner circumferential surface of the intermediate transfer belt 40. At the positions of the primary transfer rollers 24, the toner images on the photoconductor drums 21 are sequentially transferred to and superimposed on the intermediate transfer belt 40, forming a multicolor toner image thereon (in a primary transfer process).

After the primary transfer process, the surface of the photoconductor drum 21 reaches the position opposite the cleaning device 23. The cleaning device 23 collects the untransferred toner remaining on the photoconductor drum 21 (in a cleaning process). Subsequently, a residual potential of the surface of the photoconductor drum 21 is removed at the position opposite a discharging device. Thus, a series of image forming processes performed on the photoconductor drum 21 is completed.

Meanwhile, the surface of the intermediate transfer belt 40, onto which the single-color toner images on the photoconductor drums 21 are transferred and superimposed, moves in a direction indicated by an arrow in FIG. 1 and reaches the position opposite the secondary transfer roller 65. The secondary transfer roller 65 secondarily transfers the multicolor toner image on the intermediate transfer belt 40 onto the sheet P (in a secondary transfer process). After the secondary transfer process, the surface of the intermediate transfer belt 40 reaches the position opposite an intermediate-transfer-belt cleaner. The intermediate-transfer-belt cleaner collects the untransferred toner on the intermediate transfer belt 40 to complete a series of transfer processes on the intermediate transfer belt 40.

The sheet P is conveyed from the sheet feeder 61 to the position of the secondary transfer roller 65 via, for example, a registration roller pair 64. Specifically, a feed roller 62 feeds the sheet P from the top of multiple sheets P stored in the sheet feeder 61. The sheet P is conveyed to the registration roller pair 64 through a sheet conveyance passage. The sheet P that has reached the registration roller pair 64 is conveyed toward the position of the secondary transfer roller 65 so that the sheet P coincides with the arrival of the multicolor toner image on the intermediate transfer belt 40.

Subsequently, the sheet P, onto which the multicolor image is transferred, is conveyed to a fixing device 66. The fixing device 66 includes a fixing roller and a pressure roller pressing against each other. In a nip between the fixing roller and the pressure roller, the multicolor toner image is fixed on the sheet P. After the fixing process, an output roller pair 69 ejects the sheet P as an output image outside the apparatus body of the image forming apparatus 1. The ejected sheets P are stacked on an output tray 5. Thus, a series of image forming processes is completed.

Image forming devices of the image forming apparatus according to an embodiment of the present disclosure are described below in detail. The four image forming devices disposed in the body of the image forming apparatus 1 (see FIG. 1) have a similar configuration except the colors of the toner used in the image forming processes. Thus, parts of the image forming device such as the process cartridge and the developing device are illustrated without suffixes Y, M, C, and BK, which denote the colors of the toner, in the drawings.

As illustrated in FIG. 2, the process cartridge 20 typically includes the photoconductor drum 21 as the image bearer, the charging device 22, and the cleaning device 23, which are stored in a developing case of the process cartridge 20 as a single unit. The photoconductor drum 21 is an organic photoconductor designed to be charged with a negative polarity and includes a photosensitive layer formed on a drum-shaped conductive support. The charging device 22 is a charging roller including a conductive core and an elastic layer of moderate resistivity overlaid on the outer circumference of the conductive core. A power supply applies a specified voltage to the charging device 22 that is the charging roller, and the charging device 22 uniformly charges the surface of the photoconductor drum 21 opposite the charging device 22. The cleaning device 23 includes a cleaning blade **23*a* and a cleaning roller 23*b* that contact the photoconductor drum 21. For example, the cleaning blade 23*a* is made of rubber, such as urethane rubber, and contacts the surface of the photoconductor drum 21 at a specified angle with a specified pressure. The cleaning roller 23*b*** is a brush roller in which brush bristles are provided around a core.

Figure 3:
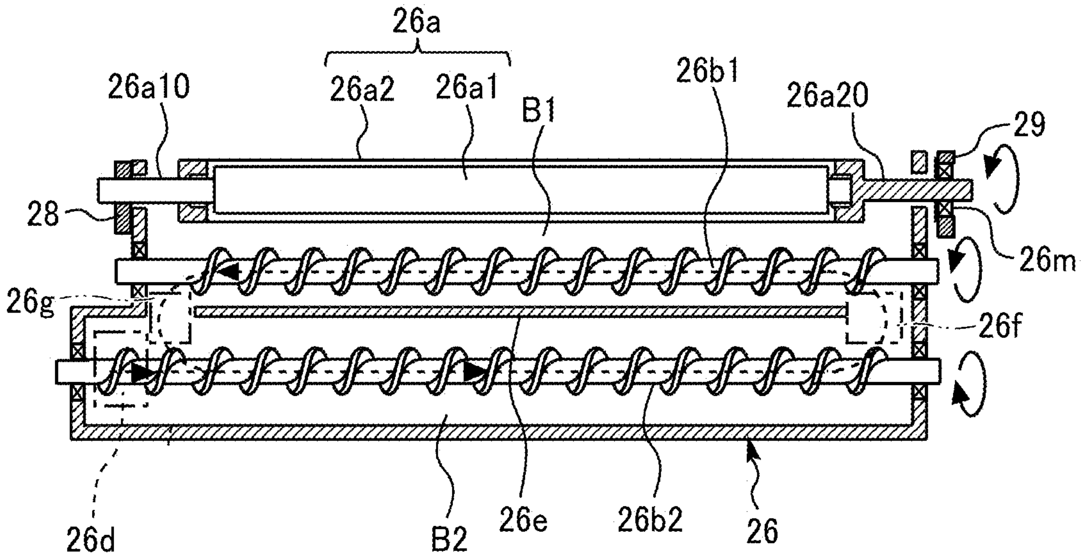
FIG. 3 is a cross-sectional view of a developing device and a photoconductor drum as viewed along a longitudinal direction (axial direction) of the developing device.

As illustrated in FIGS. 2 and 3, the developing device 26 typically includes a developing roller **26*a* as a developer bearer, a first conveying screw 26*b*1 as a first conveyor facing the developing roller 26*a*, a partition 26*e*, a second conveying screw 26*b*2 as a second conveyor facing the first conveying screw 26*b*1 via the partition 26*e*, and a round-bar doctor 26*c* as a developer regulator facing the developing roller 26*a* to regulate the amount of developer borne on a surface of the developing roller 26*a***.

The developing device 26 stores two-component developer including carrier and toner. The developing roller **26*a* faces the photoconductor drum 21 with a small development gap PG (clearance), thereby forming a developing area. As illustrated in FIG. 3, the developing roller 26*a* includes a magnet 26*a*1 and a sleeve 26*a*2 (a developing sleeve). The magnet 26*a*1 is non-rotatably secured inside the developing roller 26*a* and generates multiple magnetic poles (magnetic field) around an outer circumferential surface of the developing roller 26*a*. The sleeve 26*a*2 rotates around the magnet 26*a*1. The round-bar doctor 26*c* as a developer regulator is a round-bar-shaped member formed of a metallic material. The round-bar doctor 26*c* is disposed below the developing roller 26*a* and is opposite to the developing roller 26*a* with a small doctor gap DG (clearance) to optimize the amount of the developer carried on the surface of the developing roller 26*a***.

The first conveying screw **26*b*1 and the second conveying screw 26*b*2 convey the developer stored in the developing device 26 in a longitudinal direction of the developing device 26, thereby establishing a circulation passage indicated by the dashed arrow in FIG. 3. In other words, the first conveying screw 26*b*1 establishes a first conveyance passage B1, whereas the second conveying screw 26*b*2 establishes a second conveyance passage B2. The circulation passage of the developer includes the first conveyance passage B1 and the second conveyance passage B2. The partition 26*e* is an inner wall and separates the first conveyance path B1 from the second conveyance path B2. The first conveyance path B1 and the second conveyance path B2 communicate with each other via a first communication opening 26*f* and a second communication opening 26*g* disposed at both longitudinal ends of the first conveyance path B1 and the second conveyance path B2. Specifically, with reference to FIG. 3, in a conveyance direction of the developer, an upstream end of the first conveyance path B1 communicates with a downstream end of the second conveyance path B2 via the first communication opening 26*f*. On the other hand, in the conveyance direction of the developer, a downstream end of the first conveyance path B1 communicates with an upstream end of the second conveyance path B2 via the second communication opening 26*g*. In other words, the partition 26*e* is disposed along the circulation passage except both longitudinal ends of the circulation passage. The first conveying screw 26*b*1 (or the first conveyance passage B1) is disposed to face the developing roller 26*a*. The second conveying screw 26*b*2 (or the second conveyance passage B2) is disposed to face the first conveying screw 26*b*1 (or the first conveyance passage B1) via the partition 26*e*. The first conveying screw 26*b*1 supplies developer toward the developing roller 26*a* and collects the developer separated from the developing roller 26*a* after the development process while conveying the developer in the longitudinal direction (i.e., the lateral direction in FIG. 3 and the axial direction) of the developing device 26. The second conveying screw 26*b*2 stirs and mixes the developer after the development process conveyed from the first conveyance passage B1 with fresh toner supplied from a toner supply inlet 26*d* while conveying the developer and the fresh toner in the longitudinal direction of the developing device 26. In the present embodiment, the two conveying screws (i.e., the first conveying screw 26*b*1 and the second conveying screw 26*b*2) are horizontally arranged in parallel. Each of the two conveying screws (i.e., the first conveying screw 26*b*1 and the second conveying screw 26*b*2**) includes a shaft and a screw blade wound around the shaft.

With reference to FIGS. 2 and 3, a description is given in further detail of the image forming processes described above, focusing on the development process. The developing roller 26_a_ (the developer bearer) rotates in a direction indicated by an arrow in FIG. 2. As illustrated in FIGS. 2 and 3, the first conveying screw 26_b_1 and the second conveying screw 26_b_2 are disposed facing each other with the partition 26_e_ interposed therebetween and rotate in directions indicated by arrows in FIGS. 2 and 3. Toner is supplied from the toner container 70 to the toner supply inlet 26_d_ through a toner supply passage. As the first conveying screw 26_b_1 and the second conveying screw 26_b_2 rotate in the respective directions in FIG. 2, the developer stored in the developing device 26 circulates together with the supplied toner in the longitudinal direction of the developing device 26 (i.e., the direction indicated by the dashed arrow in FIG. 3) while being stirred and mixed with the supplied toner. The toner is charged by friction with carrier in the developer and electrostatically attracted to the carrier. Then, the toner is scooped up on the developing roller 26_a_ together with the carrier by a developer scooping pole generated on the developing roller 26_a_. The developer borne on the developing roller 26_a_ is conveyed in the counterclockwise direction indicated by the arrow in FIG. 2 to the position opposite the round-bar doctor 26_c_. The round-bar doctor 26_c_ adjusts the amount of the developer on the developing roller 26_a_ to a proper amount at the position. Subsequently, the rotation of the sleeve 26_a_2 of the developing roller 26_a_ conveys the developer to the developing area in which the developing roller 26_a_ faces the photoconductor drum 21. The toner in the developer is attracted to the electrostatic latent image formed on the photoconductor drum 21 due to the effect of an electric field generated in the developing area. As the sleeve 26_a_2 rotates, the developer remaining on the developing roller 26_a_ reaches above the first conveyance passage B1 and is separated from the developing roller 26_a_. The electric field in the developing area is generated by a specified voltage (in other words, a development bias) applied to the developing roller 26_a_ by a development power supply and a surface potential (in other words, a latent image potential) formed on the surface of the photoconductor drum 21 in the charging process and the exposure process.

The toner in the toner container 70 is supplied through the toner supply inlet 26_d_ to the developing device 26 as the toner in the developing device 26 is consumed. The toner consumption in the developing device 26 is detected by a toner concentration sensor that magnetically detects a toner concentration in the developer (i.e., a ratio of toner to the developer) in the developing device 26. The toner supply inlet 26_d_ is disposed above an end of the second conveying screw 26_b_2 (or the second conveyance passage B2) in a longitudinal direction of the second conveying screw 26_b_2 (i.e., a lateral direction and an axial direction in FIG. 3).

As the developer used in an embodiment of the present disclosure, known developer can be used. For example, as the toner (which is toner in developer or toner in the toner container 70), small-diameter toner that is polymerized toner and has a volume average particle diameter of about 5.8 μm can be used. A small-diameter carrier formed to have a weight average particle diameter of 20 to 60 μm can be used as carrier in the developer.

The configuration and operation of the developing device 26 according to the present embodiment are described in detail below. As described above with reference to FIGS. 2 and 3, the developing device 26 that develops latent images formed on the photoconductor drum 21 (image bearer) includes the developing roller 26_a_ that carries developer and the round-bar doctor 26_c_ as a developer regulator.

Figure 4A:
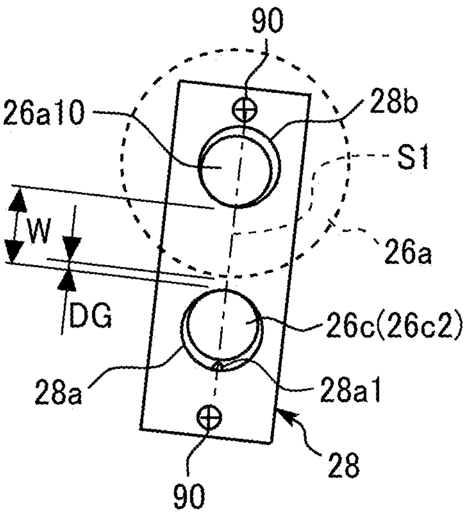
FIGS. 4A and 4B are diagrams illustrating a positional relation among a holder, a developing roller, and a round-bar doctor.
Figure 4B:
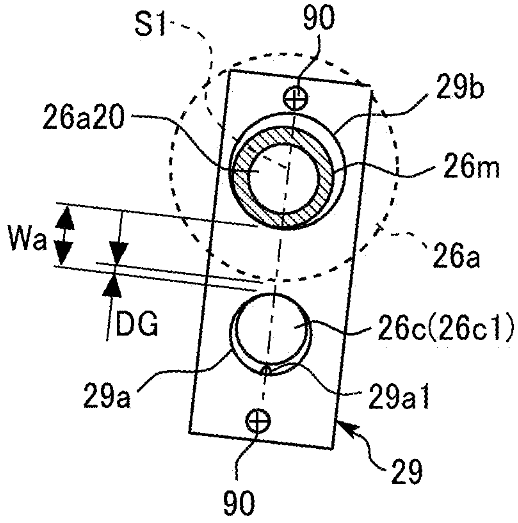
Figure 5:
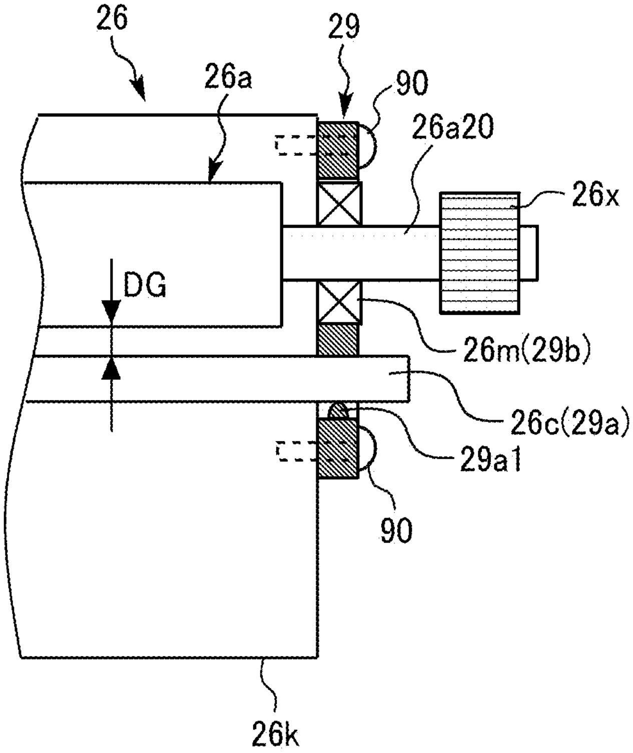
FIG. 5 is a diagram illustrating one end of the developing device in the axial direction.

The developing roller 26_a_ includes the sleeve 26_a_2 that is rotatable and the magnet 26_a_1 as a magnetic field generator that is non-rotatably disposed inside the sleeve 26_a_2. The sleeve 26_a_2 is a substantially cylindrical member, and is provided with a rotation shaft 26_a_20 as a shaft at one end (the right end in FIGS. 3 and 5) in an axial direction (the left-and-right direction in FIGS. 3 and 5 and a direction perpendicular to the plane on which FIGS. 2, 4A, and 4B are illustrated), and is provided with a bearing that supports a non-rotation shaft 26_a_10 (shaft) of the magnet 26_a_1 at the other end (the left end in FIGS. 3 and 5) in the axial direction. As illustrated in FIG. 5, a drive gear 26_x_ is mounted on the rotation shaft 26_a_20 of the sleeve 26_a_2. A drive is transmitted to the drive gear 26_x_ from a drive motor via a gear train. As a result, the developing roller 26_a_ (sleeve 26_a_2) is driven to rotate in a specified rotation direction. The magnet 26_a_1 is a substantially cylindrical member, and is provided with a non-rotation shaft 26_a_10 as another end in an axial direction (the left end in FIGS. 3 and 5). A shaft at one end in the axial direction (the right end in FIGS. 3 and 5) is supported by a bearing in the sleeve 26_a_2. The non-rotation shaft 26_a_10 of the magnet 26_a_1 had a D-cut portion and is fitted with a D hole formed in a developing case 26_k_ (or a first holder 28 to be described below) to be held non-rotatable in the developing case 26_k_.

The round-bar doctor 26_c_ faces the developing roller 26_a_ at a position below the developing roller 26_a_, and functions as a round-bar shaped developer regulator that regulates the amount of developer carried on the developing roller 26_a_. A columnar or cylindrical member made of a metal material such as non-magnetic stainless steel can be used as the round-bar doctor 26_c_. The round-bar doctor 26_c_ is held non-rotatable in the developing case 26_k_ via the holders 28 and 29 to be described below. Using a round-bar-shaped developer regulator (the round-bar doctor 26_c_) can relieve a load on the developer, can increase the mechanical strength of the developer regulator, and can increase the precision of the doctor gap DG, as compared with using a plate-shaped (blade-shaped) developer regulator.

With reference to FIGS. 3 and 5, the developing device 26 according to the present embodiment includes two holders (a first holder 28 and a second holder 29) that define a space (the doctor gap DG) between the developing roller 26_a_ and the round-bar doctor 26_c_ to hold the developing roller 26_a_ and the round-bar doctor 26_c_. The holders 28 and 29 are substantially plate-shaped members formed of a hard resin material or a metal material. The first holder 28 has a first hole 28_a_ and a second hole 28_b_. The second holder 29 has a first hole 29_a_ and a second hole 29_b_. Each of the holders 28 and 29 holds an end (one end 26_c_1 or the other end 28_c_2) of the round-bar doctor 26_c_ (the developer regulator) and the shaft (the non-rotation shaft 26_a_10 or the rotation shaft 26_a_20) of the developing roller 26_a_. Each of the first holes 28_a_ and 29_a_ is a through hole into which the end (one end 26_c_1 or the other end 28_c_2) of the round-bar doctor 26_c_ (a developer regulator) is inserted. The second holes 28_b_ and the 29_b_ are through holes into which the shaft (the non-rotation shaft 26_a_10 or the rotation shaft 26_a_20) of the developing roller 26_a_ is inserted.

Specifically, the first holder 28 is removably (replaceably) installed at the other end (the left end in FIG. 3) in the axial direction of the developing device 26 (the developing case 26_k_). In the first holder 28, the other end 28_c_2 of the round-bar doctor 26_c_ is inserted into the first hole 28_a_, and the shaft (the non-rotation shaft 26_a_10) of the developing roller 26_a_ (the magnet 26_a_1) is inserted into the second hole 28_b_. As described above, the second hole 28_b_ of the first holder 28 may be a D hole that fits the D-cut portion of the non-rotation shaft 26_a_10. On the other hand, the second holder 29 is removably (replaceably) installed at the one end (the right end in FIGS. 3 and 5) in the axial direction of the developing device 26 (the developing case 26*k*). In the second holder 29, the one end 28*c*1 of the round-bar doctor 26*c* is inserted into the first hole 29*a*, and the shaft (the rotation shaft 26*a*20) of the developing roller 26*a* (the sleeve 26*a*2) is inserted into the second hole 29*b* via a bearing 26*m*. In the first holder 28 and the second holder 29, a gap W between the first hole 28*a* and the second hole 28*b* and a gap Wa between the first hole 29*a* and the second hole 29*b* are formed accurately to the target dimensions, and thus the doctor gap DG between the developing roller 26*a* and the round-bar doctor 26*c* is also easily maintained at the target value.

As described above, in the present embodiment, the holders 28 and 29 are removably (replaceably) installed at both ends of the developing device 26 (the developing case 26*k*) in the axial direction. Specifically, with reference to FIG. 5, the holder 28 can be removed from the developing case 26*k* and replaced with another holder 28, for example, by removal of a screw 90 without removal of a component such as the developing roller 26*a* or the round-bar doctor 26*c* disposed in the developing case 26*k*. The holder 29 can be removed from the developing case 26*k* and replaced with another holder 29, for example, by removal of a screw 90 without removal of a component such as the developing roller 26*a* or the round-bar doctor 26*c* disposed in the developing case 26*k*. With such a configuration, when the doctor gap DG of the developing device 26 already installed in the image forming apparatus 1 is preferably to be changed (when the image density is preferably to be adjusted), the doctor gap DG can be easily changed only by replacing the holders 28 and 29 of the already installed developing device 26 without replacing the developing device 26 itself with another developing device.

With reference to FIGS. 4A, 4B, and 5, in the present embodiment, in the holder 28, a projection 28*a*1 that protrudes toward the inside (i.e., toward the circular center) is formed on the inner circumferential surface of at least one of the first hole 28*a* and the second hole 28*b* (the first hole 28*a* in the present embodiment). In the holder 29, a projection 29*a*1 that protrudes toward the inside (i.e., toward the circular center) is formed on the inner circumferential surface of at least one of the first hole 29*a* and the second hole 29*b* (the first hole 29*a* in the present embodiment). Specifically, one projection 28*a*1 is formed in the first hole 28*a* of the first holder 28. The projection 28*a*1 determines the position of the other end 26*c*2 (end) of the round-bar doctor 26*c* in the first hole 28*a*. One projection 29*a*1 is formed in the first hole 29*a* of the second holder 29. The projection 29*a*1 determines the position of the one end 26*c*1 (end) of the round-bar doctor 26*c* in the first hole 29*a*. The projections 28*al* and 29*a*1 are integrally formed with the holders 28 and 29, respectively, do not have elasticity, are made of, for example, a hard resin material or a metal material, and have rigidity (rigidity to the extent that the shaft and the end can be fixed and held in the hole even if the shaft and the end are fit-pressed and compressed). In the present embodiment, each of the projections 28*al* and 29*a*1 is formed in a substantially hemispherical shape and is in substantially point contact with an end of the round-bar doctor 26*c*. In the first holes 28*a* and 29*a* (holes in which the projections 28*a*1 and 29*a*1 are formed), the projections 28*a*1 and 29*a*1 are formed on a side away from the counterpart holes (second holes 28*b* and 29*b*) with respect to the hole centers of the first holes 28*a* and 29*a*, respectively. In other words, the projections 28*a*1 and 29*a* 1 are disposed to face the shafts 26*a*10 and 26*a*20 (the second holes 28*b* and 29*b*) of the developing roller 26*a* via the ends 26*c*2 and 26*c*1 of the round-bar doctor 26*c*, respectively.

Figure 6:
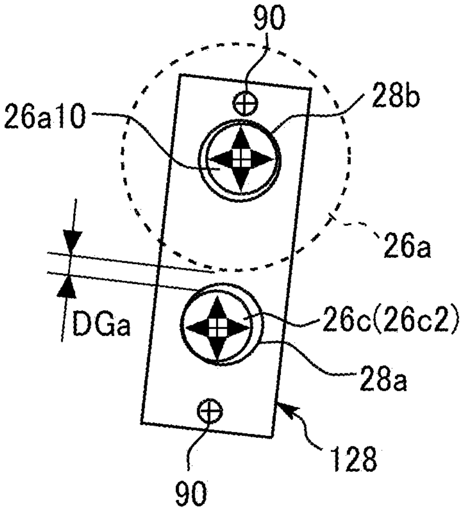
FIG. 6 is a diagram illustrating a positional relation among a holder, a developing roller, and a round-bar doctor according to a comparative example.

As described above, in the developing device 26 according to the present embodiment, the projections 28*a*1 and 29*a*1 are formed in the first holes 28*a* and 29*a* of the holders 28 and 29 for defining the doctor gap DG, respectively. Thus, the space (the doctor gap DG) between the developing roller 26*a* and the round-bar doctor 26*c* can be stably maintained. Specifically, in the case of a holder 128 in which no projection 28*a*1 is formed as a comparative example illustrated in FIG. 6, the relative position of the round-bar doctor 26*c* with respect to the developing roller 26*a* is uncertain due to rattling between the first hole 28*a* and the end 26*c*2 of the round-bar doctor 26*c* or rattling between the second hole 28*b* and the shaft 26*a*10 of the developing roller 26*a*, and thus the doctor gap DGa cannot be accurately set to a target value. The doctor gap DGa varies during operation of the developing device 26 (during a developing process). Accordingly, the amount of developer carried on the developing roller 26*a* varies, and thus an image with a large density deviation is formed on the photoconductor drum 21. On the other hand, in the present embodiment, even if there is rattling between the second hole 28*b* and the shaft 26*a*10 of the developing roller 26*a*, rattling between the first hole 28*a* and the end 26*c*2 of the round-bar doctor 26*c* is less likely to occur. Thus, the above-described failure is less likely to occur. In other words, the doctor gap DG is easily set to a target value with precision, and the amount of the developer (the developer to be subjected to the developing process in the developing region) carried on the developing roller 26*a* is optimized at the position of the round-bar doctor 26*c*, so that the preferable developing process is performed.

With reference to FIGS. 4A and 4B, in the present embodiment, when viewed in a cross section orthogonal to the axial direction, the projection 28*a*1 formed on the first hole 28*a* is formed on an imaginary line S1 connecting between the hole center of the first hole 28*a* and the hole center of the second hole 28*b*, and the projection 29*a*1 formed on the first hole 29*a* is formed on an imaginary line S1 connecting between the hole center of the first hole 29*a* and the hole center of the second hole 29*b*. With such a configuration, in the first holes 28*a* and 29*a*, the ends 26*c*2 and 26*c*1 of the round-bar doctor 26*c* contact the projections 28*a*1 and 29*a*1 at positions closest to the second holes 28*b* and 29*b* (positions at which the distance W between the first hole 28*a* and the second hole 28*b* and the distance Wa between the first hole 29*a* and the second hole 29*b* are dimensionally controlled with precision), respectively. As a result, the doctor gap DG is more likely to be stable.

First Modification

Figure 7A:
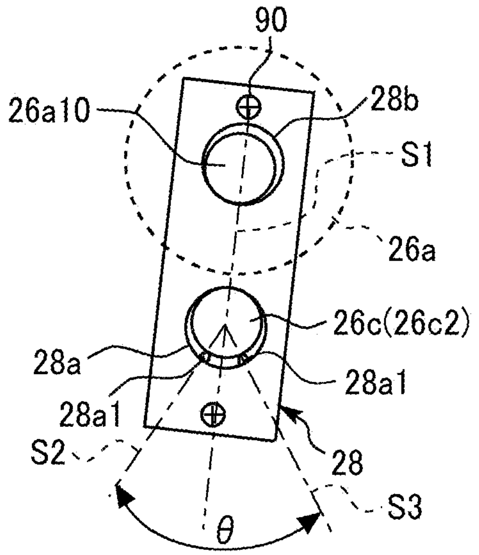
FIGS. 7A and 7B are diagrams illustrating a positional relation among a holder, a developing roller, and a round-bar doctor according to a first modification.
Figure 7B:
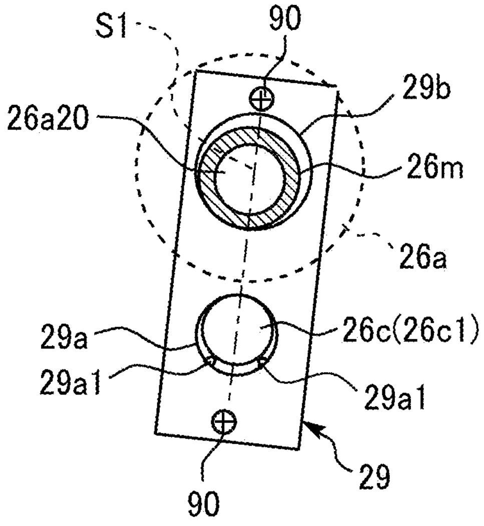

As illustrated in FIGS. 7A and 7B, in the first modification, a holder 28 is provided with two projections 28*a*1, and a holder 29 is provided with two projections 29*a*1. Specifically, when viewed in a cross section orthogonal to the axial direction, the two projections 28*a*1 are disposed at substantially equal distances from an imaginary line S1 connecting between the hole center of the first hole 28*a* and the hole center of the second hole 28*b*, and the two projections 29*a*1 are disposed at substantially equal distances from an imaginary line S1 connecting between the hole center of the first hole 29*a* and the hole center of the second hole 29*b*. In other words, the two projections 28*a*1 are line-symmetrical with each other with respect to the imaginary line S1, and the two projections 29*a*1 are line-symmetrical with each other with respect to the imaginary line S1. Specifically, the two projections 28_a_1 are formed in the first hole 28_a_ of the first holder 28, and the two projections 29_a_1 are formed in the first hole 29_a_ of the second holder 29. With such a configuration, in the first holes 28_a_ and 29_a_, the round-bar doctor 26_c_ (the ends 26_c_2 and 26_c_1) is positioned by the two projections 28_a_1 and 29_a_1, respectively, in a well-balanced manner. With reference to FIGS. 7A and 7B, in the first modification, in the first hole 28_a_ (the hole in which the two projections 28_a_1 are formed) when viewed in a cross section orthogonal to the axial direction, an angle θ formed by a first imaginary line S2 connecting between one of the two projections 28_a_1 and the hole center of the hole 28_a_ and a second imaginary line S3 connecting between the other of the two projections 28_a_1 and the hole center of the holes 28_a_ is set to 20° or more and 150° or less (20°≤θ≤150°), respectively. In the same manner, in the first hole 29_a_ (the hole in which the two projections 29_a_1 are formed) when viewed in a cross section orthogonal to the axial direction, an angle θ formed by a first imaginary line connecting between one of the two projections 29_a_1 and the hole center of the hole 29_a_ and a second imaginary line connecting between the other of the two projections 29_a_1 and the hole center of the holes 29_a_ is set to 20° or more and 150° or less (20°≤θ≤150°). Preferably, the angle θ is set to 30° or more and 90° or less (30°≤θ≤90°). In the case of the above-described angle θ being less than 20°, even if the two projections 28_a_1 and the two projections 29_a_1 are provided, the effect of positioning the round-bar doctor 26_c_ (the ends 26_c_2 and 26_c_1) in a well-balanced manner decreases. On the other hand, in the case of the angle θ exceeding 150°, even if the two projections 28_a_1 and the two projections 29_a_1 are provided, the force pressing the round-bar doctor 26_c_ decreases. The effect also decreases of positioning the round-bar doctor 26_c_ (the ends 26_c_2 and 26_c_1) in a well-balanced manner when one of the two projections 28_a_1 and 29_a_1 is broken.

Second Modification

Figure 8A:
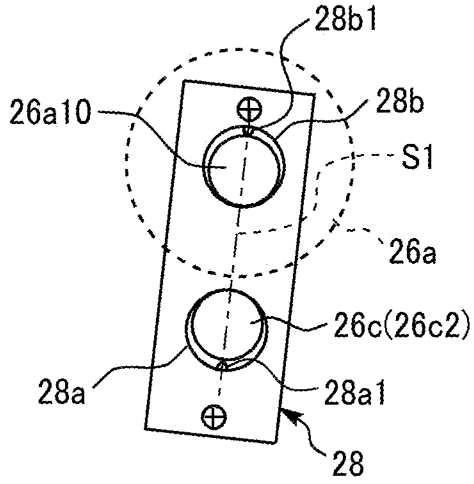
FIGS. 8A and 8B are diagrams illustrating a positional relation among a holder, a developing roller, and a round-bar doctor according to a second modification.
Figure 8B:
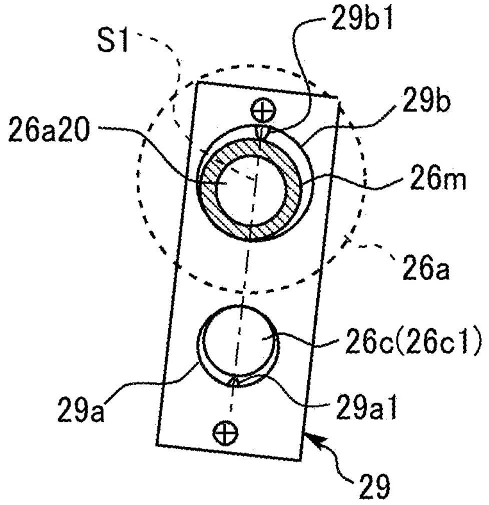

As illustrated in FIGS. 8A and 8B, a holder 28 (29) according to the second modification is provided with one projection 28_a_1 (29_a_1) in the first hole 28_a_ (29_a_) and one projection 28_b_1 (29_b_1) in the second hole 28_b_ (29_b_). In particular, as illustrated in FIG. 8A, in the first holder 28, one projection 28_a_1 is formed in the first hole 28_a_ to define the position of the other end 26_c_2 of the round-bar doctor 26_c_, and one projection 28_b_1 is also formed in the second hole 28_b_ to define the position of the non-rotation shaft 26_a_ 10 of the developing roller 26_a_. In addition, as illustrated in FIG. 8B, in the second holder 29, one projection 29_al_ is formed in the first hole 29_a_ to define the position of the one end 26_c_1 of the round-bar doctor 26_c_, and one projection 29_b_1 is also formed in the of the second hole 29_b_ to define the position of the rotation shaft 26_a_20 of the developing roller 26_a_. The projection 29_b_1 formed in the second hole 29_b_ of the second holder 29 is in contact with an outer circumferential surface (outer ring) of the bearing 26_m_ (which is a ball bearing) that rotatably supports the rotation shaft 26_a_20 rather than in contact with the rotation shaft 26_a_20 that rotates, and thus abrasion due to slide resistance does not occur. As described above, the first hole 28_a_ (29_a_) is provided with the projection 28_a_1 (29_a_1), and the second hole 28_b_ (29_b_) is provided with the projection 28_b_1 (29_b_1), so that the doctor gap DG between the developing roller 26_a_ and the round-bar doctor 26_c_ are more stable. In the second modification, the first hole 28_a_ (29_a_) is provided with one projection 28_a_1 (29_a_1), and the second hole 28_b_ (29_b_) is provided with one projection 28_b_1 (29_b_1). However, the first hole 28_a_ (29_a_) may be provided with two projections 28_a_1 (29_a_1), and the second hole 28_b_ (29_b_) may be provided with two projections 28_b_1 (29_b_1), as in the first modification.

Third Modification

Figure 9A:
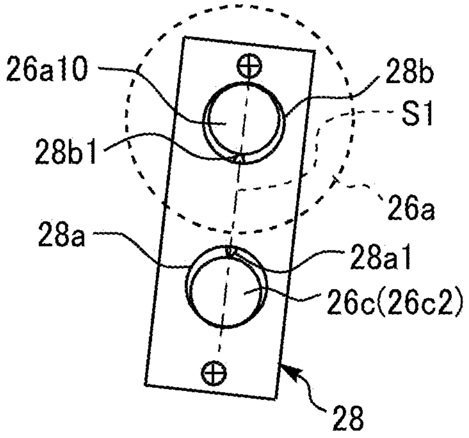
FIGS. 9A and 9B are diagrams illustrating a positional relation among a holder, a developing roller, and a round-bar doctor according to a third modification.
Figure 9B:
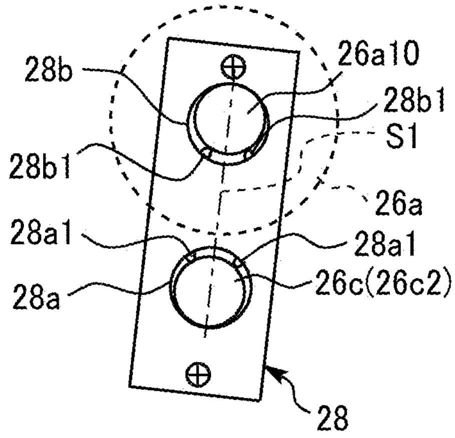

As illustrated in FIGS. 9A and 9B, a first holder 28 according to the third modification is provided with the first hole 28_a_ and the second hole 28_b_. The first hole 28_a_ has one projection or two projections 28_a_1. The second hole 28_b_ has one projection or two projections 28_b_1. Specifically, in the first holder 28 in FIG. 9A, the first hole 28_a_ is provided with one projection 28_a_1, and the second hole 28_b_ is provided with one projection 28_b_1. On the other hand, in the first holder 28 of FIG. 9B, the first hole 28_a_ is provided with two projections 28_a_1, and the second hole 28_b_ is provided with two projections 28_b_1. Also in the second holder 29, the first hole 29_a_ is provided with one projection or two projections 29_a_1, and the second hole 29_b_ is provided with one projection or two projections 29_b_1. In any of the cases of FIG. 9A and FIG. 9B, the projection(s) 28_a_1 is (are) formed on the side closer to the second hole 28_b_ than the hole center of the first hole 28_a_ is. The projection(s) 28_b_1 is (are) formed on the side closer to the first hole 28_a_ than the hole center of the second hole 28_b_ is. In other words, in the first hole 28_a_, the end 26_c_2 of the round-bar doctor 26_c_ faces the shaft 26_a_10 (the second hole 28_b_) of the developing roller 26_a_ via the projection(s) 28_a_1. In addition, in the second hole 28_b_, the shaft 26_a_10 of the developing roller 26_a_ faces the end 26_c_2 (the first hole 28_a_) of the round-bar doctor 26_c_ via the projection(s) 28_b_1. Also in a case of such a configuration, rattling of the end 26_c_2 of the round-bar doctor 26_c_ in the first hole 28_a_ is reduced, and rattling of the non-rotation shaft 26_a_10 of the developing roller 26_a_ in the second hole 28_b_ is also reduced, so that the doctor gap DG between the developing roller 26_a_ and the round-bar doctor 26_c_ is further likely to be stabilized. As in the third modification, when the projections 28_a_1 and 28_b_1 are arranged on the inner side, the accuracy of projection lengths of the projections 28_a_1 and 28_b_1 may affect the accuracy of the doctor gap DG, and thus it is preferable to arrange the projection(s) 28_a_1 on the outer side as in FIGS. 4A and 4B.

Fourth Modification

Figure 10:
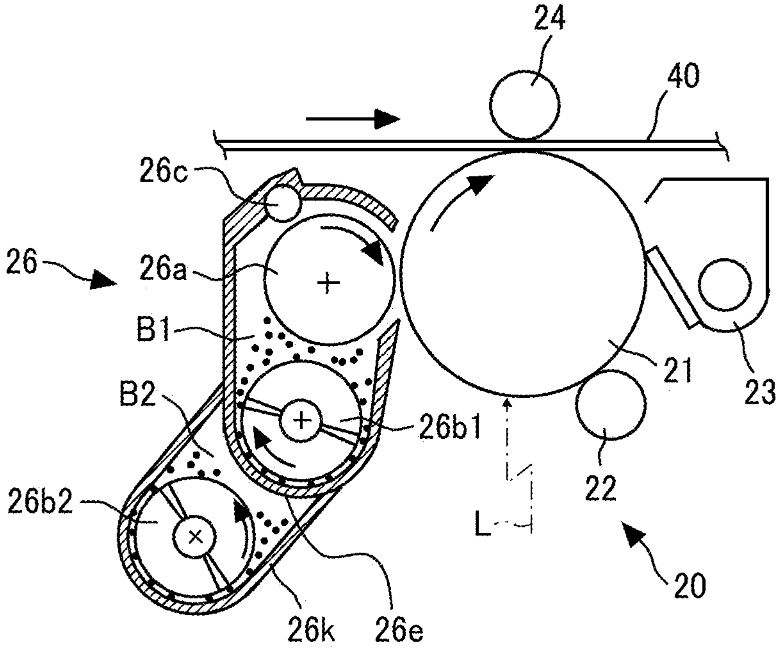
FIG. 10 is a diagram illustrating a developing device (image forming device) according to a fourth modification.

As illustrated in FIG. 10, a developing device 26 according to the fourth modification is different from the developing device 26 illustrated in FIG. 2 typically in that the round-bar doctor 26_c_ is disposed above the developing roller 26_a_, that the developing roller 26_a_ rotates in a counter direction with respect to a rotation direction of the photoconductor drum 21 in a development region, and that the second conveying screw 26_b_2 (the second conveyance path B2) is disposed diagonally below the first conveying screw 26_b_1 (the first conveyance path B1). In the fourth modification, the photoconductor drum 21 and the developing roller 26_a_ move in opposite directions rather than the same direction in the developing range. Even if the difference in linear velocity between the photoconductor drum 21 and the developing roller 26_a_ in the developing range is small, this configuration can preferably develop the latent image on the photoconductor drum 21. Also in the fourth modification, the developing device 26 includes the holders 28 and 29. The holder 28 is provided with the first hole 28_a_ in which the end 26_c_2 of the round-bar doctor 26_c_ is inserted and the second hole 28_b_ in which the shaft 26_a_10 arranged at an end of the developing roller 26_a_ is inserted. The first hole 28_a_ holds the end 26_c_2, and the second hole 28_b_ holds the shaft 26_a_10. The holder 29 is provided with the first hole 29_a_ in which the end 26_c_1 of the round-bar doctor 26_c_ is inserted and the second hole 29_b_ in which the shaft 26_a_20 arranged at an end of the developing roller 26_a_ is inserted. The first hole 29_a_ holds the end 26*c*1, and the second hole 29*b* holds the shaft 26*a*20. The projection 28*a*1 that protrudes inward is formed on an inner circumferential surface of at least one hole of the first hole 28*a* and the second hole 28*b*, and the projection 29*a* 1 that protrudes inward is formed on an inner circumferential surface of at least one hole of the first hole 29*a* and the second hole 29*b*. With such a configuration, the clearance (doctor gap DG) between the developing roller 26*a* and the round-bar doctor 26*c* (developer regulator) is likely to be stable.

As described above, the developing device 26 according to the present embodiment is a developing device that develops a latent image formed on the photoconductor drum 21 (image bearer) and includes the developing roller 26*a* that carries developer. The round-bar doctor 26*c* (developer regulator) is disposed opposite the developing roller 26*a* to regulate the amount of the developer carried on the surface of the developing roller 26*a*. The developing device 26 includes the holders 28 and 29. The holder 28 is provided with the first hole 28*a* in which the end 26*c*2 of the round-bar doctor 26*c* is inserted and the second hole 28*b* in which the shaft 26*a*10 arranged at an end of the developing roller 26*a* is inserted. The first hole 28*a* holds the end 26*c*2, and the second hole 28*b* holds the shaft 26*a*10. The holder 29 is provided with the first hole 29*a* in which the end 26*c*1 of the round-bar doctor 26*c* is inserted and the second hole 29*b* in which the shaft 26*a*20 arranged at an end of the developing roller 26*a* is inserted. The first hole 29*a* holds the end 26*c*1, and the second hole 29*b* holds the shaft 26*a*20. The projection 28*a*1 that protrudes inward is formed on an inner circumferential surface of at least one hole of the first hole 28*a* and the second hole 28*b*, and the projection 29*a* 1 that protrudes inward is formed on an inner circumferential surface of at least one hole of the first hole 29*a* and the second hole 29*b*. With such a configuration, the clearance (doctor gap DG) between the developing roller 26*a* and the round-bar doctor 26*c* (developer regulator) is likely to be stable.

In the present embodiment, the process cartridge 20 does not include the developing device 26. The developing device 26 is a unit that is independently attachable to and removable from the body of the image forming apparatus 1. Alternatively, the developing device 26 may be one of the constituent elements of the process cartridge 20. In this case, the process cartridge 20 including the developing device 26 as an integral part is attachable to and removable from the body of the image forming apparatus 1. In such a configuration, similar effects to those of the present embodiment are also attained. The term "process cartridge" used in the present disclosure is defined as a unit that unites an image bearer and at least one of a charging device to charge the image bearer, a developing device to develop a latent image on the image bearer, and a cleaning device to clean the image bearer and that is attachable to and removable from the body of the image forming apparatus.

In the present embodiment, the developing device 26 includes the two conveying screws (i.e., the first conveying screw 26*b*1 and the second conveying screw 26*b*2) as the conveyors horizontally arranged in parallel and the round-bar doctor 26*c* disposed below the developing roller 26*a*. However, the configuration of the developing device to which the present disclosure is applied is not limited to the above-described configurations. The present disclosure may be applied to other developing devices such as a developing device including two conveyors obliquely arranged, a developing device including two conveyors arranged in parallel in the vertical direction, a developing device including three or more conveyors arranged, a developing device including the round-bar doctor disposed below the developing roller, or a developing device in which the developing roller rotates in the same direction as the photoconductor drum rotates in the developing region. Even in such a case can also provide similar effects to those of the present embodiment.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components such as the number, the position, and the shape are not limited to the above-described embodiments, and thus may be set to any number, position, and shape suitable for an embodiment of the present disclosure.

Aspects of the present disclosure may be, for example, combinations of first to eleventh aspects as follows.

First Aspect

A developing device (e.g., the developing device 26) that develops a latent image formed on an image bearer (e.g., the photoconductor drum 21) includes a developing roller (e.g., the developing roller 26*a*), a round-bar-shaped developer regulator (e.g., the round-bar doctor 26*c*), and a holder (e.g., the holder 28, the holder 29). The developing roller carries developer. The developer regulator faces the developing roller and regulates an amount of developer carried on a surface of the developing roller. The holder is provided with a first hole (e.g., the first hole 28*a*, the first hole 29*a*) in which an end (e.g., the end 26*c*1, the end 26*c*2) of the developer regulator is inserted, a second hole (e.g., the second hole 28*b*, the second hole 29*b*) in which a shaft (e.g., the non-rotation shaft 26*a*10, the rotation shaft 26*a*20) at an end of the developing roller is inserted, and a projection (e.g., the projection 28*a*1, the projection 28*b*1, the projection 29*a*1, the projection 29*b*1) formed on an inner circumferential surface of at least one of the first hole and the second hole, the projection protruding toward an inside of the at least one of the first hole and the second hole. The holder holds the end of the developer regulator and the shaft.

Second Aspect

In the developing device (e.g., the developing device 26) according to the first aspect, the holder (e.g., the holder 28, the holder 29) is detachably attached to each axial end of the developing device.

Third Aspect

In the developing device (e.g., the developing device 26) according to the second aspect, the developing roller (e.g., the developing roller 26*a*) includes a rotatable sleeve (e.g., the sleeve 26*a*2), and a magnetic field generator (e.g., the magnet 26*a*1) non-rotatably disposed inside the sleeve. In the holder (e.g., the holder 28, the holder 29) on the one axial end, one end of the developer regulator (e.g., the round-bar doctor 26*c*) is inserted into the first hole (e.g., the first hole 29*a*), and a shaft (e.g., the rotation shaft 26*a*20) of the sleeve (e.g., the sleeve 26*a*2), is inserted into the second hole (e.g., the second hole 29*b*) via a bearing (e.g., the bearing 26*m*). In the holder on the other axial end, the other end of the developer regulator is inserted into the first hole (e.g., the first hole 28*a*), and a shaft (e.g., the rotation shaft 26*a*10) of the magnetic field generator is inserted into the second hole (e.g., the second hole 28*b*).

Fourth Aspect

In the developing device (e.g., the developing device 26) according to any one of the first to third aspects, the projection (e.g., the projection 28*a*1, the projection 28*b*1, the projection 29*a*1, the projection 29*b*1) sets a position of the end of the developer regulator in the first hole (e.g., the first hole 28*a*, the first hole 29*a*) or a position of the shaft (e.g., the non-rotation shaft 26*a*10, the rotation shaft 26*a*20) in the second hole (e.g., the second hole 28*b*, the second hole 29*b*), and has rigidity.

Fifth Aspect

In the developing device (e.g., the developing device 26) according to any one of the first to fourth aspects, the projection (e.g., the projection 28*a*1, the projection 28*b*1, the projection 29*a*1, the projection 29*b*1) is one projection (e.g., the projection 28*a*1, the projection 29*a*1) formed on an imaginary line (e.g., the imaginary line S1) connecting a hole center of the first hole (e.g., the first hole 28*a*, the first hole 29*a*) and a hole center of the second hole (e.g., the second hole 28*b*, the second hole 29*b*) when viewed in a cross section orthogonal to an axial direction.

Sixth Aspect

In the developing device (e.g., the developing device 26) according to any one of the first to fourth aspects, two projections (e.g., the projection 28*a*1, the projection 29*a*1), including the projection (e.g., the projection 28*a*1, the projection 28*b*1, the projection 29*a*1, the projection 29*b*1). are formed at substantially equal distance from an imaginary line (e.g., the imaginary line S1) connecting a hole center of the first hole (e.g., the first hole 28*a*, the first hole 29*a*) and a hole center of the second hole (e.g., the second hole 28*b*, the second hole 29*b*) when viewed in a cross section orthogonal to an axial direction.

Seventh Aspect

In the developing device (e.g., the developing device 26) according to the sixth aspect, in the at least one of the first hole (e.g., the first hole 28*a*, the first hole 29*a*) and the second hole (e.g., the second hole 28*b*, the second hole 29*b*) in which the two projections (e.g., the projection 28*a*1, the projection 28*b*1, the projection 29*a*1, the projection 29*b*1) are formed, an angle (e.g., the angle θ) formed by a first imaginary line (e.g., the first imaginary line S2) connecting one of the two projections and a hole center of the at least one of the first hole and the second hole and a second imaginary line (e.g., the second imaginary line S3) connecting the other of the two projections and the hole center is 20° or greater and 150° or less, as viewed in the cross section orthogonal to the axial direction.

Eighth Aspect

In the developing device (e.g., the developing device 26) according to any one of the first to seventh aspects, in one of the first hole (e.g., the first hole 28*a*, the first hole 29*a*) and the second hole (e.g., the second hole 28*b*, the second hole 29*b*) in which the projection (e.g., the projection 28*a*1, the projection 28*b*1, the projection 29*a*1, the projection 29*b*1) is formed, the projection is formed on a side farther from the other of the first hole and the second hole with respect to a hole center of the one of the first hole and the second hole.

Ninth Aspect

In the developing device (e.g., the developing device 26) according to any one of the first to seventh aspects, in one of the first hole (e.g., the first hole 28*a*, the first hole 29*a*) and the second hole (e.g., the second hole 28*b*, the second hole 29*b*) in which the projection (e.g., the projection 28*a*1, the projection 28*b*1, the projection 29*a*1, the projection 29*b*1) is formed, the projection is formed on a side closer to the other of the first hole and the second hole with respect to a hole center of the one of the first hole and the second hole.

Tenth Aspect

A process cartridge (e.g., the process cartridge 20) is attachable to and detachable from a body of an image forming apparatus (e.g., the image forming apparatus 1). The process cartridge includes the developing device (e.g., the developing device 26) according to any one of the first to ninth aspects and the image bearer (e.g., the photoconductor drum 21) united with the developing device.

Eleventh Aspect

An image forming apparatus (e.g., the image forming apparatus 1) includes the developing device (e.g., the developing device 26) according to any one of the first to ninth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A developing device for developing a latent image formed on an image bearer, the developing device comprising:

a developing roller to carry developer;

a developer regulator of a round-bar shape facing the developing roller to regulate an amount of the developer carried on a surface of the developing roller; and a holder having:

a first hole in which an end of the developer regulator is inserted;

a second hole in which a shaft at an end of the developing roller is inserted; and a first projection and a second projection on an inner circumferential surface of at least one of the first hole or the second hole, the projections protruding toward an inside of the at least one of the first hole or the second hole, the holder holding the end of the developer regulator and the shaft, wherein the first projection and the second projection are disposed at substantially equal distances from an imaginary line connecting a hole center of the first hole and a hole center of the second hole when viewed in a cross section orthogonal to an axial direction of the developing device.

2. The developing device according to claim 1, further comprising:

another holder including:

a corresponding first hole in which another end of the developer regulator is inserted, and a corresponding second hole in which the shaft of the developing roller is inserted, wherein the holder and the another holder are detachably attached to one axial end and an other axial end, respectively, of the developing device.

3. The developing device according to claim 2, wherein the developing roller includes:

a rotatable sleeve; and a magnetic field generator non-rotatably disposed inside the sleeve, wherein, in the holder on the one axial end of the developing device, the end of the developer regulator is inserted in the first hole and an end of the shaft which is rotatable with the sleeve, is inserted in the second hole via a bearing, and wherein, in said another holder on the other axial end of the developing device, the other axial end of the developer regulator is inserted in the first hole of said another holder and another end of the shaft which is attached to the magnetic field generator, is inserted in the second hole of said another holder.

4. The developing device according to claim 1, wherein the projections have rigidity and set a position of the end of the developer regulator in the first hole or a position of the shaft in the second hole.

5. The developing device according to claim 1, wherein, in the at least one of the first hole or the second hole in which the two projections are formed, an angle formed by a first imaginary line connecting one of the two projections and a hole center of the at least one of the first hole or the second hole and a second imaginary line connecting the other of the two projections and the hole center is 20° or greater and 150° or less, as viewed in the cross section orthogonal to the axial direction.

6. The developing device according to claim 1, wherein, in one of the first hole and the second hole in which the projections are formed, the projections are disposed on a side farther from the other of the first hole and the second hole with respect to a hole center of the one of the first hole and the second hole.

7. The developing device according to claim 1, wherein, in one of the first hole and the second hole in which the projections are formed, the projections are disposed on a side closer to the other of the first hole and the second hole with respect to a hole center of the one of the first hole and the second hole.

8. A process cartridge attachable to and detachable from a body of an image forming apparatus, the process cartridge comprising:

the developing device according to claim 1; and the image bearer united with the developing device.

9. An image forming apparatus comprising the developing device according to claim 1.

10. The developing device according to claim 1, wherein: the projections have a substantially hemispherical shape.

11. The developing device according to claim 1, wherein: the projections are each in substantially point contact with the end of the developer regulator.

12. The developing device according to claim 1, wherein: the projections have rigidity to fix and hold the end of the developer regulator in the at least one of the first hole or the second hole.

13. The developing device according to claim 1, wherein: the holder includes a hard resin.

14. The developing device according to claim 1, wherein: the holder includes metal.

* * * * *